United States Patent [19]

Konen

[11] Patent Number: 4,623,883
[45] Date of Patent: Nov. 18, 1986

[54] AUTOMATIC COMMUNICATIONS SWITCH

[75] Inventor: Noel R. Konen, Easley, S.C.

[73] Assignee: NCR Corporation, Dayton, Ohio

[21] Appl. No.: 680,118

[22] Filed: Dec. 10, 1984

[51] Int. Cl.$^4$ .............................................. H04Q 1/00
[52] U.S. Cl. .............................. 340/825.01; 364/187; 371/9
[58] Field of Search ................... 340/825.01; 364/187; 371/9, 65

[56] References Cited

U.S. PATENT DOCUMENTS

| | | | |
|---|---|---|---|
| 4,153,198 | 5/1979 | Eki et al. | 371/9 |
| 4,276,593 | 6/1981 | Hansen | 371/9 |
| 4,527,235 | 7/1985 | Chebra | 371/9 |

*Primary Examiner*—Donald J. Yusko
*Attorney, Agent, or Firm*—Wilbert Hawk, Jr.; Albert L. Sessler, Jr.; Elmer Wargo

[57] ABSTRACT

An automatic communications switching circuit is used to couple a primary terminal, an alternate terminal, a cluster of secondary terminals and a host system to enable communication and data transfer among the terminals and host system. The primary terminal normally handles data transfer and communication for the cluster of secondary terminals when the switching circuit is in the first state. A lack of polling by the primary terminal (which is an indication of inoperativeness of the primary terminal) is sensed by the alternate terminal which then starts the polling process. The polling by the alternate terminal is sensed by the switching circuit which is then switched to a second state in which the alternate terminal functions as the "primary" terminal.

5 Claims, 4 Drawing Figures

AUTOMATIC COMMUNICATIONS SWITCH

BACKGROUND OF THE INVENTION

This invention relates generally to a system in which a primary terminal normally handles data interchange or communications among a plurality of secondary terminals and in which an alternate terminal is provided and has as one of its functions that of acting as an "alternate primary terminal" to handle the communications among the plurality of secondary terminals, for example; this invention relates specifically to a communications switch which automatically enables the alternate primary terminal to function as the primary terminal when the primary terminal is inoperative for one reason or another.

One of the known ways in which the switching from the primary terminal to the alternate primary terminal was effected in a system as generally described was to wait until the primary terminal was inoperative as indicated by, for example, a display message indicating the inoperative state on one of the secondary terminals. An operator at the secondary terminal would have to go to the primary terminal which might be located in a supervisor's office in order to find out what was wrong with the system. The primary terminal might indicate, through its associated display, that it was unable to communicate with the secondary terminal. Thereafter, the operator would actuate a manually-operated switch which caused the alternate primary terminal to function as the primary terminal and the "now downed primary terminal" to function as the alternate primary terminal to permit communications to be resumed.

SUMMARY OF THE INVENTION

A preferred embodiment of this invention is disclosed in a system comprising: a primary terminal having primary and secondary communication lines; an alternate terminal having primary and secondary communication lines; a cluster of terminals having communication lines to interconnect said cluster of terminals; a switching circuit being operatively coupled to said primary and alternate terminals and said communication lines to said cluster of terminals; said switching circuit also being switchable between first and second states; said switching circuit having first means for coupling said primary communication lines of said primary terminal with said communication lines to said cluster of terminals when said switching circuit is in said first state and also for coupling said secondary communication lines of said primary terminal with said communication lines to said cluster of terminals when said switching circuit is in said second state; said switching circuit having second means for coupling said secondary communication lines of said alternate terminal with said communication lines to said cluster of terminals when said switching circuit is in said first state and also for coupling said primary communication lines of said alternate terminal with said communication lines to said cluster of terminals when said switching circuit is in said second state; means for sensing when said primary terminal is inoperative; and said switching circuit also having means for switching automatically said switching circuit from said first state to said second state when said sensing means senses that said primary terminal is inoperative.

The communications switch of this invention provides a simple, low cost way of automatically sensing when a controlling primary terminal is inoperative and to automatically switch to an alternate controlling terminal when the primary terminal is inoperative. The communications switch also enables the primary terminal and the alternate controlling terminal to communicate with a host system.

These advantages and others will be more readily understood in connection with the following description, claims, and drawings.

DETAILED DESCRIPTION OF THE INVENTION

Figure 1:
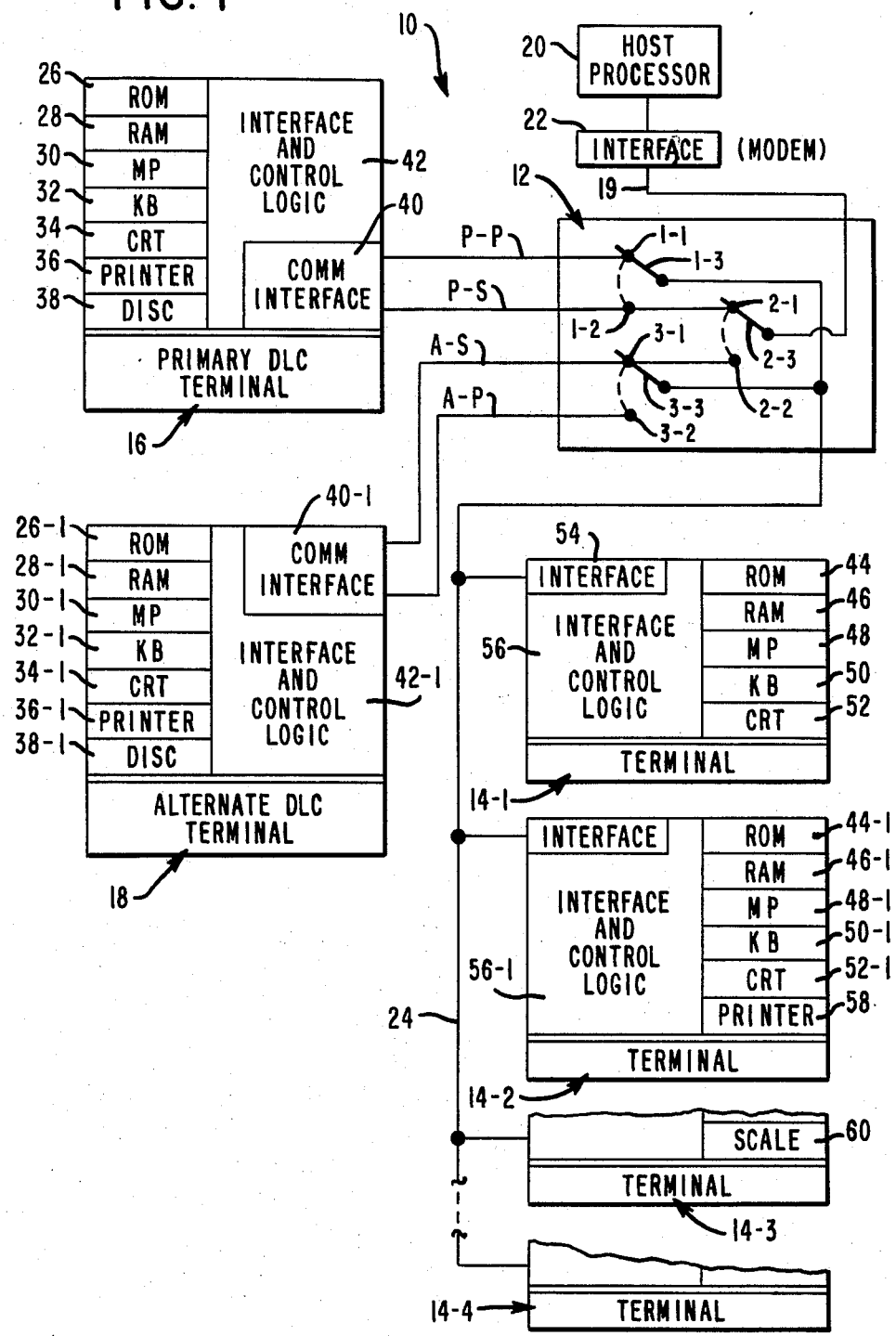
FIG. 1 is a schematic diagram, in block form, showing a system in which a preferred embodiment of the communications switch of this invention may be used, with the switch being shown in a first state.

FIG. 1 is a schematic diagram, in block form of a system 10 in which the communications switch (designated generally as 12) of this invention may be used. The system 10 includes a plurality of data entry terminals 14-1, 14-2, 14-3 and 14-4, for example, which are coupled to a primary DLC terminal 16 and an alternate DLC terminal 18 through the communications switch 12, hereinafter referred to as switch 12. The term DLC used with terminal 16, for example, is an acronym which stands for Data Link Communications which is a communications protocol used by NCR Corporation for "in-house" communications. This DLC protocol is currently available from the NCR Corporation of Dayton, Ohio. The switch 12 also provides for coupling to an external entity such as a host processor 20 via a link 19 and an interface 22 such as a modem.

In the embodiment described, the primary terminal 16 and the alternate terminal 18 may be conventional terminals like the NCR 2951, 2950, or 2957. Similarly, the terminals 14-1, 14-2, 14-3, and 14-4 may be conventional terminals like the NCR 2950, for example, and the host processor may be conventional like the NCR 5094. All the NCR products mentioned in this paragraph are available from the NCR Corporation of Dayton, Ohio.

In the system 10 shown in FIG. 1, the primary terminal 16 may be considered as the "host" for the terminals 14-1 through 14-4. In general, the terminals, like 14-1, may be terminals like those found in grocery stores, for example, which are coupled together over a communication link 24 to the primary terminal 16. Under normal situations, the primary terminal 16 handles the data interchange among the terminals 14-1 through 14-4. When these terminals, like 14-1, want to communicate with the host processor 20, they do so by communicating with the primary terminal 16 which, in turn, communicates with the host processor 20. When the primary terminal 16 "goes down" or is unable to function as described, the alternate terminal 18 becomes the "primary" terminal to handle the communications among the terminals 14-1 through 14-4 and to communicate with the host processor 20. When the alternate terminal 18 becomes the "primary" terminal, the primary terminal 16 becomes the "alternate" terminal. The switching of the functions of the terminals 16 and 18 is effected by the communications switch 12 under certain circumstances as will be described hereinafter.

Before describing the communications switch 12, it appears appropriate to discuss generally the known terminals 16, 18, and 14-1 through 14-4. The primary terminal 16 comprises a read only memory (ROM) 26, a random access memory (RAM) 28, a processor (MP) 30, a keyboard (KB) 32, a display or cathode ray tube (CRT) 34, a printer 36, a data storage disc 38, a communication interface 40, and interface and control logic 42 which couple the various components mentioned. The alternate terminal 18 has components which are identical to those in terminal 16, and accordingly, the corresponding elements in alternate terminal 18 are given the same reference numerals as are given the elements of terminal 16; however, these reference numerals have a dash number (−1) attached to them.

The terminal 14-1 (FIG. 1) includes a ROM 44, RAM 46, processor (MP) 48, keyboard KB (50), a display or cathode ray tube (CRT) 52, a communication interface 54, and interface and control logic 56 which couple the various components mentioned. The terminals 14-1 through 14-4 are all identical, except for a few differences to be explained, and accordingly, the identical elements are provided with a reference numeral having a dash number (−1) as explained in the previous paragraph. Terminal 14-2 is different because it includes a printer 58, and terminal 14-3 is different because is includes a weighing scale 60.

The terminals 14-1 through 14-4 (FIG. 1) are sometimes referred to as secondary terminals in that they are controlled in large part by a higher-order terminal like primary terminal 16. These terminals 14-1 through 14-4 do not have large memories, and consequently, they often have to transfer data to the data storage disc 38 associated with the primary terminal 16. The primary terminal 16 also is used to control some of the functions at the terminals 14-1 through 14-4. For example, an operator at terminal 14-1 may wish to use the printer 58 associated with terminal 14-2 or the weighing scale 60 associated with terminal 14-3. The request made by an operator at the terminal 14-1 is transferred to the primary terminal 16 which then checks the availability of the scale 60, for example, at terminal 14-3. If the scale 60 is available, the primary terminal 16 issues an order or control signal to energize the scale 60. The operator then uses the scale 60 and the weight from the scale 60 is then routed to the primary terminal 16 which thereafter indicates the weight on the CRT 52 of the terminal 14-1 on which the request for the use of the scale 60 was entered. The primary terminal 16 may also be used as a "super accountant" to accumulate data from the terminals 14-1 through 14-4, to generate reports from the data, and to transfer the data or reports generated thereby to the host processor 20.

With the general discussion given relative to the operation of the system 10 (FIG. 1), it is apparent that it is necessary to maintain data transfer among the various terminals and the host processor 20 shown in FIG. 1. As previously stated, the alternate terminal 18 takes over in place of the primary terminal 16 when terminal 16 becomes inoperative. In this regard, the primary terminal 16 is coupled to the communications switch 12 by primary DLC lines which are marked P-P in FIG. 1, and secondary DLC lines which are marked P-S. Correspondingly, the alternate terminal 18 is coupled to the communications switch 12 by primary DLC lines which are marked as A-P in FIG. 1, and secondary DLC lines which are marked A-S.

In the embodiment described, the P-P and the P-S lines of the primary terminal 16 (FIG. 1), and the A-P and A-S lines of the alternate terminal 18 are each comprised of four lines or conductors (two for transmitting and two for receiving) as will be described hereinafter. The communications link 24 is also comprised of four conductors with two conductors being used for the transmitting mode and two being used for the receiving mode.

The general connections through the communications switch 12 (FIG. 1) are best explained by viewing schematically, the connections effected by the switch 12 when it is in either its first or second state. When the switch 12 is in the first state shown in FIG. 1, the P-P lines from the primary terminal 16 pass through the switch to be coupled to the communication link 24 and the terminals 14-1 through 14-4, and in addition, the P-P lines are coupled to the A-S (secondary lines) of the alternate terminal 18. Notice that the secondary lines P-S of the primary terminal 16 are coupled to the host processor 20 when the switch 12 is in the first state which is the normal operating position. When the switch 12 is in the first state, the primary terminal 16 acts as the controlling host or terminal for the secondary terminals 14-1 through 14-4. Note also that while the alternate terminal 18 is presently in the back-up mode in the example described, it is also coupled to the primary terminal 16 (via the A-S lines) and consequently, it can also perform operations instead of simply sitting idly in a back-up mode.

Figure 2:
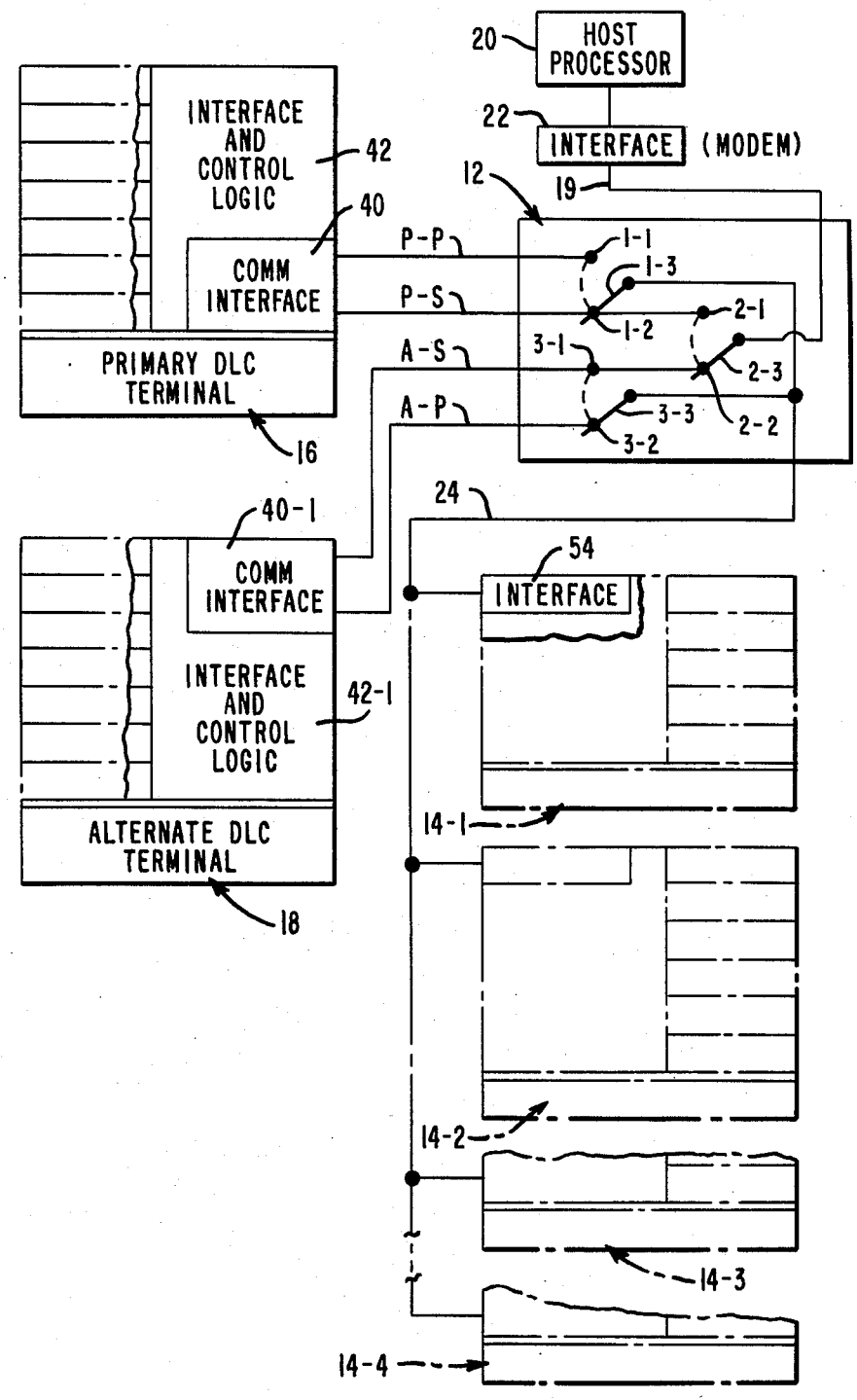
FIG. 2 is a schematic diagram, in block form, showing only a portion of the system shown in FIG. 1, with the switch being shown in the second state of two states.

The general connections through the communications switch when it is in the second state are shown schematically in FIG. 2. In this state, the alternate terminal 18 becomes the "primary" terminal, and the primary terminal 16 becomes the "alternate" terminal. Notice that the communication link 24 is now coupled through the switch 12 to the A-P or primary lines of the alternate terminal 18 and the secondary lines P-S of the primary terminal 16, and the alternate terminal's secondary lines A-S are coupled to the host processor 20. Notice also that the P-S or secondary lines from the primary terminal 16 are coupled through the communications link 24 to the primary lines A-P of the alternate terminal 18.

Figure 3:
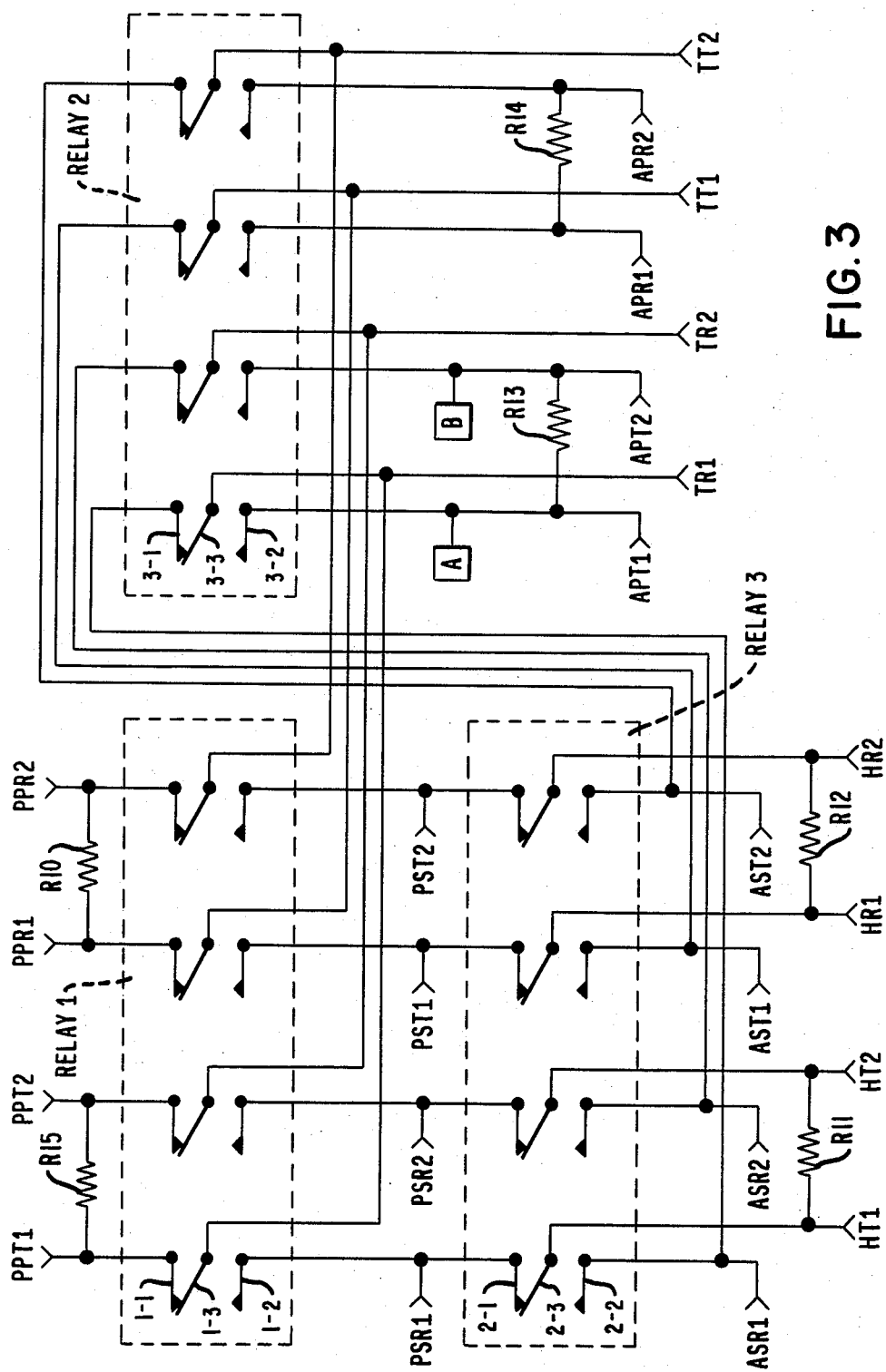
FIG. 3 is a schematic diagram showing the contacts of switching relays associated with the communications switch shown in FIG. 1.
Figure 4:
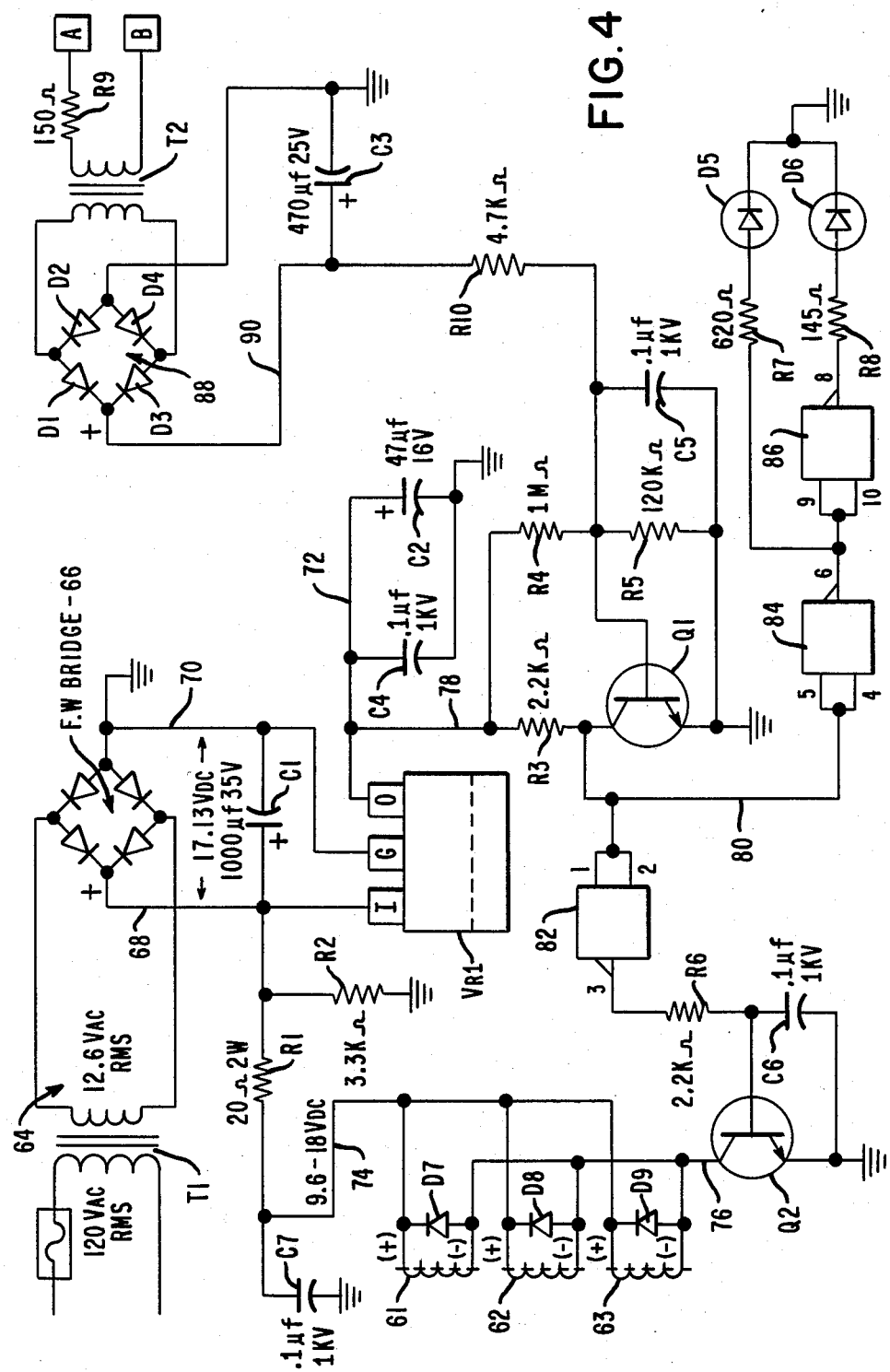
FIG. 4 is a schematic diagram of a circuit which is used to switch the communications switch between the first and second states mentioned.

Having described the general connections through the communications switch 12, it now appears appropriate to discuss the details of this switch which are shown in FIGS. 3 and 4.

FIG. 3 is a schematic diagram showing the contacts of switching relays that are associated with the communications switch 12. In the embodiment described, there are three relays, namely relay 1, relay 2, and relay 3 whose coils 61, 62, and 63, respectively, are shown in FIG. 4. The contacts of the relays 1, 2, and 3 are shown in their normal operating condition in FIG. 3, in which condition the coils 61, 62, and 63, respectively, are in the deenergized state; in this state, the communications switch 12 is in the state shown in FIG. 1.

In order tp simplify the drawing in FIG. 3, the contacts associated with a particular relay are encircled by a dashed line as shown for relays 1, 2, and 3. In the embodiment described, each of the relays 1, 2, and 3 is a four pole, double-throw switch. Accordingly, relay 1 has terminal position contacts which are numbered 1-1 and 1-2 and the associated moveable arm is numbered 1-3 for each pole. Only one set of contacts 1-1 and 1-2 and one moveable arm 1-3 is marked within the dashed line marked as relay 1 in FIG. 3 in order to simplify the drawing. The same numbering technique is used for relay 2 which has terminal position contacts 2-1 and 2-2 and the associated moveable arm 2-3. Similarly, the same numbering technique is used for relay 3 which has terminal position contacts 3-1 and 3-2 and the associated moveable arm 3-3.

The contacts shown in FIG. 3 are assigned designations which make their correlation with the contacts in switch 12, shown only schematically in FIG. 1, easy to follow. For example, the line marked P-P (coming from the primary terminal 16 in FIG. 1) is comprised of four lines marked PPT1, PPT2, PPR1, and PPR2 in FIG. 3. The PPT1 and PPT2 lines comprise a pair of "transmit" lines and the PPR1 and PPR2 lines comprise a pair of "receive" lines. Similarly, the secondary lines P-S from the primary terminal 16 are comprised of the four lines marked PSR1, PSR2, PST1, and PST2 in FIG. 3. The PSR1 and PSR2 lines comprise the "receive" lines and the PST1 and PST2 lines comprise the "transmit" lines. The primary lines A-P (FIG. 1) coming from the alternate terminal 18 are comprised of four lines marked APT1, APT2, APR1, and APR2 as shown in FIG. 3. The APT1 and APT2 lines comprise a pair of "transmit" lines and the APR1 and APR2 lines comprise a pair of "receive" lines. The secondary lines A-S (FIG. 1) coming from the alternate terminal 18 are comprised of four lines marked ASR1, ASR2, AST1, and AST2 as shown in FIG. 3. The ASR1 and ASR2 lines comprise a pair of "receive" lines and the AST1 and AST2 lines comprise a pair of "transmit" lines. The link 19 to the host processor 20 (FIG. 1) is comprised of four lines HT1, HT2, HR1 and HR2 as shown in FIG. 3. The HT1 and HT2 lines comprise a pair of "transmit" lines and the HR1 and HR2 lines comprise a pair of "receive" lines as shown in FIG. 3. And finally, the link 24 leading to the terminals 14-1 through 14-4 is comprised of the lines TR1, TR2, TT1 and TT2. The TR1 and TR2 lines comprise the "receive " lines, and the TT1 and TT2 lines comprise the "transmit" lines. These lines TR1, TR2, TT1, and TT2 are connected to each of the terminals 14-1 through 14-4. Indentification or address codes which are part of a transmitted message are used to select the particular terminal 14-1 through 14-4 which is to receive the message. Notice that a message transmitted from the primary terminal 16, passes over the transmit lines PPT1 and PPT2 (FIG. 3) to the receive contacts TR1 and TR2 of the terminals 14-1 through 14-4, and in addition, the message is transmitted through the arms 3-3 and contacts 3-1 of relay 3 to the secondary receive contacts ASR1 and ASR2 of the alternate terminal 18. Notice that the pair of primary "transit lines" PPT1 and PPT2 (FIG. 3) of the primary terminal 16 are aligned with the secondary "receive" lines PSR1 and PSR2 across the contacts of relay 1. Similarly, the primary "receive" lines PPR1 and PPR2 are aligned with the secondary "transmit" lines PST1 and PST2 across the contacts of relay 1. In other words, when the switch 12 is in the first state shown in FIGS. 1 and 3, the primary lines PPT1, PPT2, PPR1, AND PPR2 are active to the terminals 14-1 through 14-4 and to the secondary lines ASR1, ASR2, AST1 and AST2, respectively of the alternate terminal 18. This enables the alternate terminal 18 to monitor the activity on the transmission lines PPR1 and PPT2 of the primary terminal 16 via the secondary lines ASR1 and ASR2 associated with the alternate terminal 18. This is how the alternate terminal 18 determines when the primary terminal 16 is not functioning properly so as to cause the communications switch 12 to switch to the second state to enable the alternate terminal 18 to function as the primary terminal.

In the normal operating situation, the communications switch 12 is in the first state shown in FIGS. 1 and 3. In the first state mentioned, the primary terminal 16 polls the terminals 14-1 through 14-4 and because of the connection shown in FIG. 3 as previously mentioned, the alternate terminal 18 also monitors the polling by its ASR1 and ASR2 lines. The primary terminal 16 polls the terminals 14-1 through 14-4 and the alternate terminal 18 to ascertain which of them has data to communicate to the primary terminal 16 or has data to transfer to one another. The terminals 14-1 through 14-4 communicate with the host processor 20 through the primary terminal 16.

In the embodiment described, the primary terminal always polls the terminals 14-1 through 14-4 (between data transfer activity) as a part of normal operation, and when the primary terminal does not poll, it means that something is wrong with the primary terminal 16. There is software associated with the alternate terminal 16 which constantly monitors its ASR1 and ASR2 lines to determine whether or not the primary terminal 16 is polling the terminals like 14-1 through 14-4. When the alternate terminal 18 determines that the primary terminal 16 is not polling and is therefore inoperative, the alternate terminal 18 (through its associated software) then starts to send out polling signals on its primary transmit lines APT1 and APT2. The lines APT1 and APT2 are tapped at contacts A and B in FIG. 3, and these contacts provide the input to the rest of the communications switch 12 shown in FIG. 4.

The portion of the communications switch 12 shown in FIG. 4 contains that portion which does the actual switching of the relays 1, 2, and 3 from the first state to the second state in response to polling by the alternate terminal 18 as just described. Before discussing the operation of the switch 12, it appears appropriate to discuss some of its components.

A preferred embodiment of the communications switch 12 is shown in FIGS. 3 and 4, and the values of certain components included therein are shown in FIG. 4. These components include a conventional full-wave, rectifier bridge circuit 64 which includes a step down transformer T1 which transforms 120 volts A.C. to 12.6 volts A.C. (RMS) and a full-wave, rectifier bridge circuit 66 to provide a D.C. output of 17.13 volts across the conductors 68 and 70. Capacitor C1, which is connected across the conductor 68 and 70, is used to eliminate "spikes" and to provide a stable or "hold-up" voltage. A conventional regulator VR1 is connected across the conductor 68 and 70 to provide a 5 volt D.C. output on conductor 72. The regulator VR1 is a conventional regulator such as #7805 which is manufactured by Texas Instruments, Inc., for example. Capacitor C2, which is connected between conductor 72 and ground, is used to provide a "hold-up" voltage during the switching of transistor Q1. Capacitor C4 is used to eliminate "spikes" as is conventionally done. Resistor R1, which has one end thereof connected to conductor 68, is a current limiting resistor which is used to limit the current to 240 milliamperes and to drop the voltage to about 12 volts D.C. in the embodiment described. The resistor R2 provides some constant load in the circuit. The other end of resistor R1 provides the +D.C. voltage on conductor 74 to the relay coils 61, 62, and 63. A capacitor C7, connected between the resistor R1 and ground, eliminates any "spikes" which might exist at this point. The voltage on conductor 74 does not need to be regulated critically. In the embodiment described, the relay coils 61, 62, and 63 take about 9.6 to 18 volts when energized.

The plus (+) end of each of the relay coils 61, 62, and 63 (FIG. 4) is connected to the positive voltage on conductor 74 as shown. The negative (−) end of each of the relay coils 61, 62, and 63 is connected to the collector of transistor Q2 by a conductor 76. When the transistor Q2 conducts (as will be described hereinafter), the coils 61, 62, and 63 are energized to switch the communications switch 12 to the second state as previously described. The diodes D7, D8, and D9 are placed across the (+) and (−) ends of coils 61, 62, and 63, respectively, to provide a discharge path for the "inductive kick" which is generated when these coils are de-energized. The transistor Q2 is a power transistor which is capable of handling the current loads for a particular application. In the embodiment described, transistor Q2 is transistor 2N3055, which is manufactured, for example, by Texas Instruments, Inc. of Dallas, Texas.

The regulated +5 D.C. voltage from the regulator VR1 that appears on the conductor 78 provides the voltage for the voltage-divider resistors R4 and R5 which maintain the voltage on the base of transistor Q1 at 0.5 volts which is about 0.1 or 0.2 volts below the turn-on voltage of transistor Q1. The emitter of transistor Q1 is connected to ground, and its collector is connected to the +5 volts on conductor 78 through a resistor R3. When the transistor Q1 is in a non-conducting state, the voltage on conductor 80 (connected to the collector of Q1) is slightly less than 5 volts, and when the transistor Q1 conducts, the voltage on conductor 80 drops close to the ground level. The capacitor C5, which is connected between the base of transistor Q1 and ground, provides "spike" protection as previously explained.

The conductor 80 coming from the collector of transistor Q1 (FIG. 4) is fed into pins 1 and 2 of unit 82 and is also fed into pins 4 and 5 of unit 84. Units 82, 84, and 86 are part of an integrated circuit pack #74LS00 which is manufactured by Texas Instruments, Inc., for example. The units 82, 84, and 86 are used as inverters in the embodiment described. The pin 3 output from unit 82 is connected to the base of transistor Q2 via a resistor R6. The capacitor C6 is connected between the base of transistor Q2 and ground for "spike" protection as previously mentioned. The units 84 and 86 are used to control indicators as will be described hereinafter.

As previously stated, the contacts A and B shown in FIG. 3 provide the input to the portion of the communications switch 12 shown in FIG. 4. The contacts A and B pick up the polling signals being outputted by the alternate terminal 18 (over the lines APT1 and APT2) when the alternate terminal 18 begins to function as a primary terminal as previously described.

The polling signals presented at contacts A and B in FIG. 4 are fed into the primary winding of transformer T2, with the resistor R9 being placed in series with the primary winding of the transformer T2 to provide an appropriate impedance matching. The transformer T2 is used to isolate the portion of the switch 12 shown in FIG. 4 from the rest of the circuit, and it is also used to provide a voltage change when passing through the transformer T2. The actual absolute voltage of the rectified current coming out of the transformer T2 is not important per se. The secondary of the transformer T2 (FIG. 4) is connected to a conventional full-wave, rectifier bridge circuit 88 which is comprised of diodes D1, D2, D3 and D4 as shown. A capacitor C3 is placed across the output of the bridge circuit 88, with the positive (+) D.C. voltage appearing on conductor 90. The capacitor C3 is charged by the output of the bridge circuit 88, and this capacitor provides a stable D.C. voltage to the base of transistor Q1 via the current-limiting resistor R10.

The operation of the portion of the communications switch 12 shown in FIG. 4 is as follows. When the polling appears on contacts A and B, the polling current is rectified and the resulting D.C. voltage is used to charge the capacitor C3 and to provide a D.C. voltage to the base of transistor Q1. When the voltage on the base of transistor Q1 rises to about 0.6 to 0.7 volts, in the embodiment described, the transistor Q1 turns on, causing the voltage at its collector to fall from about five volts to about zero volts or "ground". When the voltage on conductor 80 drops to about zero volts, the output of unit 82 (which functions as an inverter) is switched to a high-enough, positive voltage to turn transistor Q2 on by applying the output voltage from unit 82 through the resistor R6 to the base of transistor Q2. When transistor Q2 is turned on, its collector and conductor 76 are placed at ground level to thereby effectively energize the coils 61, 62, and 63 causing the communications switch 12 to switch from the first or normal state shown in FIGS. 1 and 3 to the opposite or second state shown schematically in FIG. 2. In the second state, the alternate terminal 18 functions as the primary terminal as previously described. After repairs are made to the primary terminal 16 to restore it to an operative condition, the alternate terminal 18 is reset or turned off momentarily; this will cause the switch 12 to be restored to the first state and also will cause the primary terminal 16 to assume control again. If the primary terminal 16 is still inoperative, the switch 12 will be switched automatically to the second state in which the alternate terminal 18 is in control.

In order to provide an indication as to which state (first or second) the communications switch 12 is in, display lights D5 and D6 (FIG. 4) are used. When the switch 12 is in the first or normal state, there are no polling signals at contacts A and B, and consequently transistor Q1 is turned off, and the voltage on conductor 80 is near five volts. A high level input to pins 4 and 5 of unit 84 causes the output pin 6 to invert and fall to a low level. The low level from pin 6 that is fed into input pins 9 and 10 of unit 86 is inverted thereby, causing the output pin 8 of unit 86 to rise to a high level which thereby energizes the display light D6 to indicate that the primary terminal 16 is functioning normally. When the alternate terminal 18 is functioning as the primary terminal, the voltage level on conductor 80 is at low or ground level. A low voltage level at pins 4 and 5 of unit 84 causes its output pin 6 to rise to a high voltage level which energizes display light D5.

Some miscellaneous comments appear in order. Certain resistors are placed across certain primary "transmit" and "receive" lines to provide a dummy load to prevent radio frequency interference (RFI) and to terminate the lines; these resistors comprise: resistor R15 (FIG. 3) which is placed across the lines PPT1 and PPT2; resistor R10 which is placed across the lines PPR1 and PPR2; resistor R11 which is placed across the HT1 and HT2 lines; resistor R12 which is placed across the HR1 and HR2 lines; resistor R13 which is placed across the APT1 and APT2 lines; and R14 which is placed across the APR1 and APR2 lines. While the embodiment of the switch 12 described in FIGS. 3 and 4 has been described as having the relays 1, 2, and 3 de-energized when the switch 12 is in the first state mentioned, the switch 12 could be modified to have the relays 1, 2, and 3 energized when in the first state and de-energized when the switch 12 is to be operated in the second state.

What is claimed is:

1. A system comprising:
   a primary terminal having primary and secondary communication lines;
   an alternate terminal having primary and secondary communication lines;
   a cluster of terminals having communication lines to interconnect said cluster of terminals;
   a switching circuit being operatively coupled to said primary and alternate terminals and said communication lines to said cluster of terminals; said switching circuit also being switchable between first and second states;
   said switching circuit having first means for coupling said primary communication lines of said primary terminal with said communication lines to said cluster of terminals when said switching circuit is in said first state and also for coupling said secondary communication lines of said primary terminal with said communication lines to said cluster of terminals when said switching circuit is in said second state;
   means for sensing when said primary terminal is inoperative; and
   said switching circuit also having means for switching automatically said switching circuit from said first state to said second state when said sensing means senses that said primary terminal is inoperative;
   said sensing means comprising means coupled to said secondary communication lines of said alternate terminal to check for polling signals by said primary terminal and in which a lack of said polling signals is indicative of said primary terminal being inoperative;
   said switching means comprising:
   means associated with said alternate terminal for producing polling signals on said primary communication lines of said alternate terminal; and
   actuating means responsive to said polling signals on said primary communication lines of said alternate terminal to switch said switching circuit from said first state to said second state.

2. A system comprising:
   a primary terminal having primary and secondary communication lines;
   an alternate terminal having primary and secondary communication lines;
   a host processor;
   a cluster of terminals having communication lines to interconnect said cluster of terminals;
   a switching circuit being operatively coupled to said primary and alternate terminals, said host processor, and said communication lines to said cluster of terminals, and said switching circuit also being switchable between first and second states;
   said switching circuit having first means for coupling said primary communication lines of said primary terminal with said communication lines to said cluster of terminals when said switching circuit is in said first state and also for coupling said secondary communication lines of said primary terminal with said communication lines to said cluster of terminals when said switching circuit is in said second state;
   said switching circuit having second means for coupling said secondary communication lines of said primary terminal with said host processor when said switching circuit is in said first state and also for coupling said secondary communication lines of said alternate terminal with said host processor when said switching circuit is in said second state;
   said switching circuit having third means for coupling said secondary communication lines of said alternate terminal with said communication lines to said cluster of terminals when said switching circuit is in said first state and also for coupling said primary communication lines of said alternate terminal with said communication lines to said cluster of terminals when said switching circuit is in said second state;
   means for sensing when said primary terminal is inoperative; and
   said switching circuit also having menns for switching automatically said switching circuit from said first state to said second state when said sensing means senses that said primary terminal is inoperative;
   said sensing means comprising means coupled to said secondary communication lines of said alternate terminal to check for polling signals by said primary terminal and in which a lack of said polling signals is indicative of said primary terminal being inoperative,
   said switching means comprising:
   means associated with said alternate terminal for producing polling signals on said primary communication lines of said alternate terminal; and
   actuating means responsive to said polling signals on said primary communication lines of said alternate terminal to switch said switching circuit from said first state to said second state.

3. The system as claimed in claim 2 in which said first, second, and third coupling means include first, second, and third relays, respectively, with each of said first, second, and third relays having an operating coil; and
   said actuating means includes means for energizing said operating coils of said first, second, and third relays to switch said switching circuit from said first state to said second state in response to said polling signals.

4. The system as claimed in claim 3 in which said actuating means includes a transformer coupling between the primary lines of said alternate terminal and said energizing means.

5. The system as claimed in claim 4 in which said switching circuit has means for indicating whether said switching circuit is in said first state or said second state.

* * * * *